United States Patent
Weisser et al.

(10) Patent No.: US 7,221,835 B1
(45) Date of Patent: May 22, 2007

(54) ION-REDUCTION-BLACKENED EXTRA-MURAL ABSORBING MEDIA ADAPTED FOR INCLUSION IN IMAGE-CONDUCTING OPTICAL FIBER ARRAYS AND METHODS OF FABRICATING THE SAME

(75) Inventors: Michael Weisser, Sturbridge, MA (US); Paige Higby, Holland, MA (US); Richard Strack, Sturbridge, MA (US); Kevin Tabor, Webster, MA (US); James Triba, Stafford Springs, CT (US); Gary DiGregorio, Southbridge, MA (US)

(73) Assignee: Schott Corporation, Elmsford, NY (US)

( * ) Notice: Subject to any disclaimer, the term of this patent is extended or adjusted under 35 U.S.C. 154(b) by 422 days.

(21) Appl. No.: 10/997,692

(22) Filed: Nov. 24, 2004

Related U.S. Application Data

(60) Provisional application No. 60/525,063, filed on Nov. 25, 2003.

(51) Int. Cl.
| | |
|---|---|
| G02B 6/06 | (2006.01) |
| G02B 6/04 | (2006.01) |
| G02B 6/02 | (2006.01) |
| C03B 37/023 | (2006.01) |
| C03C 21/00 | (2006.01) |

(52) U.S. Cl. ............... 385/116; 385/120; 385/123; 65/385; 65/400

(58) Field of Classification Search ........ 385/115–128; 65/385, 400

See application file for complete search history.

(56) References Cited

U.S. PATENT DOCUMENTS

| | | | |
|---|---|---|---|
| 2,339,928 A | | 1/1944 | Hood |
| 3,060,789 A | | 10/1962 | Hicks |
| 3,247,756 A | | 4/1966 | Siegmund |
| 3,253,500 A | | 5/1966 | Hicks |
| 3,387,959 A | | 6/1968 | Cole |
| 3,650,598 A | | 3/1972 | Kitano et al. |
| 3,836,809 A | | 9/1974 | Condon |
| 4,011,007 A | | 3/1977 | Phaneuf et al. |
| 4,989,960 A | | 2/1991 | Thomas |
| 5,259,057 A | | 11/1993 | Cook |
| 5,351,332 A | | 9/1994 | Cook |
| 6,384,400 B1 * | | 5/2002 | Albagli et al. ........ 250/214 VT |
| 2001/0055456 A1 * | | 12/2001 | Ellison et al. .............. 385/127 |
| 2002/0168157 A1 * | | 11/2002 | Walker et al. .............. 385/115 |
| 2005/0265675 A1 * | | 12/2005 | Welker et al. .............. 385/115 |

* cited by examiner

*Primary Examiner*—Michelle Connelly-Cushwa
*Assistant Examiner*—Rhonda S. Peace
(74) *Attorney, Agent, or Firm*—Louis J. Franco; Law Office of Louis J. Franco

(57) ABSTRACT

Methods of fabricating extra-mural absorption elements adapted for incorporation in an image-conducting optical fiber array include fabricating various constituent components to be included in an optical fiber bundle from one or more reducible-ion-containing glasses. Various components fabricated from a reducible-ion-containing glass are selectively exposed to a reducing atmosphere such that they are reduction-blackened prior to at least one heating and drawing step relative to the bundle into which they are to be fusedly incorporated. Such "pre-blackened" components function as extra-mural absorption media throughout the length of an image-conducting optical fiber array and alternatively include fiber claddings and substitutional and interstitial extra-mural absorption elements.

23 Claims, 13 Drawing Sheets

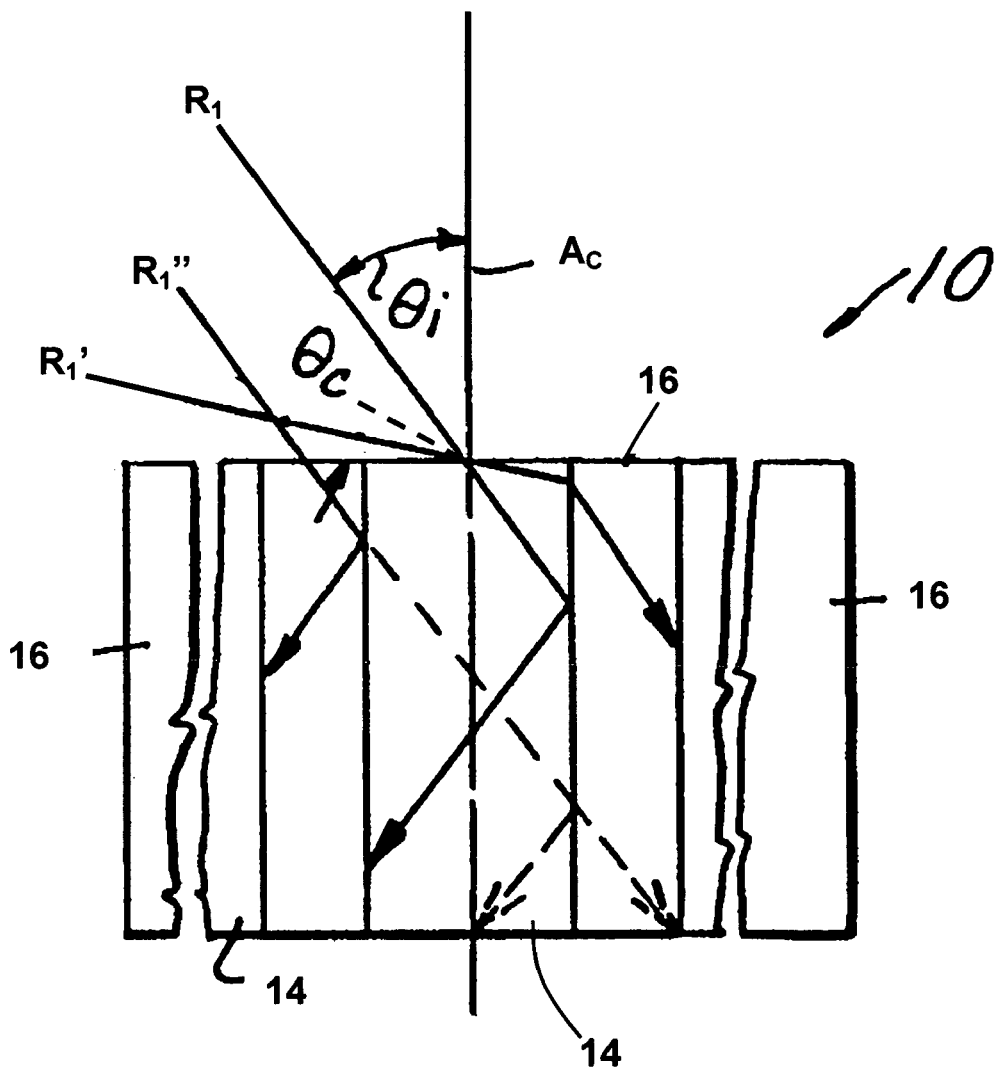
FIG. A
*(Background Art)*

160  110  130

200  110  130  210  160

Fused powder particles 410 and/or fragments 415

160

Heat and Draw to form a "thin" filament 442

Heat and Draw to form EMA Element 425

ION-REDUCTION-BLACKENED EXTRA-MURAL ABSORBING MEDIA ADAPTED FOR INCLUSION IN IMAGE-CONDUCTING OPTICAL FIBER ARRAYS AND METHODS OF FABRICATING THE SAME

PROVISIONAL PRIORITY CLAIM

Priority based on Provisional Application Ser. No. 60/525,063, filed Nov. 25, 2003, and entitled "FIBER OPTIC FACEPLATES AND OTHER OPTICAL FIBER IMAGE-CONDUCTING ARRAYS AND METHODS OF FABRICATING THAT OPTICALLY ISOLATE INDIVIDUAL FIBERS THEREIN TO FACILITATE IMAGE CONTRAST," is claimed.

BACKGROUND

1. Field

Embodiments and implementations of the present invention relate generally to image-transferring arrays such as fiber optic faceplates and other optical fiber imaging devices and more particularly to the inclusion of integral contrast enhancement in such devices.

2. Brief Description of an Illustrative Environment and Related Art

Fiber optic face plates (FOFPs) are exemplary of image transfer devices generally comprising coherent lattice arrays of step index waveguides that behave as image plane transfer devices; that is, they conduct an image from an input surface to an opposite output surface. Other known image transfer devices include elongated image conduits, micro-conduits, fiber optic tapers, fiber optic image inverters, flexible image scopes, light guides and individual optical fibers by way of non-limiting example.

A fragmentary cross-section of a fiber optic face plate 10 of a general type known to those of ordinary skill in the art is shown in FIG. A. The face plate 10 comprises a well-ordered array of two-phase optical waveguides (e.g., optical fibers) each of which waveguides includes a core 14 characterized by a first refractive index $n_1$ surrounded by a contiguous second phase cladding 16 characterized by a second refractive index $n_2$ that is lower than the first refractive index $n_1$. Glasses commonly used in the fabrication of fiber optical faceplates include high-refractive-index glasses for the core material and low-refractive-index glasses for the cladding. The core 14 extends along a core axis $A_C$. Immediately adjacent to the cladding 16, on either side of a core 14, are neighboring cores 14. In a typical fiber optic faceplate used in imaging applications, the waveguides are packed in a well-ordered lattice. Illustrative, non-limiting dimensions include a center-to-center spacing of 6 microns and a core diameter of 5 microns.

The mode of light transmission in imaging devices like the faceplate 10 in FIG. A is considered relative to a single core 14 as follows; wherein the core axis $A_C$ is treated as normal to the input surface through which incident light enters the faceplate 10. An incident light ray $R_1$ enters the core 14 at an incident angle $\theta_i$ relative to the core axis $A_C$. In accordance with Snell's Law, if the sum $(90°-\theta_i)$ is greater than the critical angle $\theta_c$ for total internal reflection, the incident ray $R_1$ is not refracted into the cladding 16 but is instead reflected down the core 14, as shown. Incident rays $R_1'$ for which the sum $(90°-\theta_i)$ is less than $\theta_c$ are at least partially refracted and pass, at least partially, into the cladding 16, where they are free to enter adjacent cores 14. This phenomenon is the most commonly discussed mode of cross-talk between constituent fiber elements in fiber optic faceplates.

A common measure of the acceptance angle of a waveguide, within which total internal reflection occurs, is the Numerical Aperture (N.A.), defined as $N.A.=\sin(90-\theta_c)=(n_1^2-n_2^2)^{1/2}$. Accordingly, for example, in the case in which the N.A. of each waveguide in the FOFP is 1.0, $\theta_c=0°$, and light up to 90° off normal incidence is totally internally reflected. For an N.A.=0.5, $\theta_c$ is 60°, and incident light of up to 30° off normal incidence is totally internally reflected.

Also shown in FIG. A is an incident ray $R_1''$ entering the cladding 16 instead of the core 14 at incident angle $\theta_i$ (i.e., parallel to $R_1$). In this case, instead of being totally internally reflected, the ray $R_1''$ is partially refracted (shown as a dotted line) into the core 14. The other portion of the incident ray $R_1''$ (shown as a solid line) is reflected back into the cladding 16 which, because the cladding 16 is a common phase, results in dissipation over a wide area. Portions of reflected rays also enter adjacent cores 14 at each subsequent reflection, leading to cross-talk. This type of cross-talk is not commonly considered a source of image quality degradation in fiber optical faceplates, but it is, in fact, quite substantial.

Light-absorbing materials (e.g., glasses) are often incorporated into fiber optic faceplates to suppress cross-talk. These absorbing materials, alternatively referred to as Extra-Mural Absorption (EMA) materials, media, glasses, fibers, filaments and rods, as indicated by context, are typically incorporated in accordance with one or more of three general methods. According to a first approach, absorptive coatings—or even sleeves or tubes—are applied to the outside of each waveguide individually yielding what is referred to as a "circumferential EMA." A second approach indicates the substitution of selected waveguides within a waveguide bundle with absorbing fibers wherein the substitute fibers are referred to as substitutional EMA fibers. According to a third common approach, absorbing fibers are inserted into the interstitial packing vacancies in the array (such fibers are known as "interstitial EMA fibers").

Although circumferential, interstitial and substitutional EMA media have met with varying degrees of success in suppressing cross talk due to the refraction and propagation of unwanted stray light, the need for black glass tubing and/or individual EMA fibers, in various configurations, invariably adds to the complexity and expense of fabrication and, furthermore, can introduce aberrations into transferred images. Moreover, the introduction of different glass compositions in an array increases the potential for adverse interactions between incompatible glasses.

Attempts have been made to reduce cross-talk, not by incorporating EMA materials along the lengths of arrays, but by preventing light from entering the cladding material at the face of an array. One method of preventing light from entering cladding material at the face includes using a cladding material containing reducible ions and then, after completion of an array product, including grinding and polishing, for example, exposing the array to a reducing atmosphere to blacken the cladding at a face of the array. As observed previously in this background section, however, light entering non-blackened cladding accounts for only a portion of cross-talk-yielding stray light; a portion of light entering the cores of a smooth-faced array also produces cross-talk. In recognition of this observation, Cook, in U.S. Pat. Nos. 5,259,057 and 5,351,332, discloses a waveguide array with an intagliated image-input surface. As explained by Cook, "the surface of the FOFP is intagliated with a cavity for each waveguide formed in the face thereof. Each cavity has side walls formed of exposed cladding. The end of the core is recessed relative to the cladding. The exposed cladding, including the side walls of the cavity, is also reduced to produce the darkened surface layer, resulting in an effective numerical aperture which eliminates cross-talk from core incident light." It will be appreciated that the intagliation and blackening by Cook reduces cross-talk caused by core-incident light by absorbing, in the blackened-cladding cavity wall, light rays that, in the absence of intagliation and subsequent blackening, would enter the core at angles greater than the critical angle as measured with respect to the core axis.

Although the intagliation and blackening in Cook constitute an apparent improvement over blackening the cladding material only in the plane of the array face, the Cook method sacrifices the benefits of including EMA material throughout the length of an image-transferring array.

Accordingly, there exists a need for a method of reducing cross-talk in optical fiber image conduits that obviates the use of traditional EMA media (e.g., black glass tubing and interstitial fibers) while, in various implementations, providing light-absorbing material along the full length of an image conduit between image input and image output faces.

SUMMARY

Implementations of the present invention are applicable to the fabrication of various alternative optical fiber image-conducting devices including, by way of non-limiting example, (i) elongated fused image bundles, including "straight-throughs," image-rotating bundles (e.g., inverters), and fused tapers such as magnifiers/reducers and (ii) non-elongated image conductors such as optical fiber faceplates. Common to the fabrication of the aforementioned apparatus is the formation of monofibers each of which monofibers is created by heating and collapsing a cladding tube around a core rod in accordance with the well-known rod-in-tube method. Plural monofibers are subsequently bundled, heated and drawn to form what is commonly referred to as a "multi." Commonly, plural "multies" are subsequently bundled, heated and drawn to form a "multi—multi."

Alternative implementations involve the blackening of material by exposure to a reducing atmosphere prior to at least one heating and drawing step in the fabrication of an image transfer device. Some versions include blackening of reducible-ion-containing cladding tubes prior to heating and collapsing of the tubes about optical core rods in the initial formation of reduction-blackened monofiber rods that are subsequently bundled, drawn and fused to form alternative image transfer apparatus. In versions including selectively blackened cladding, the cladding functions as an EMA medium. Alternative versions relate to the novel fabrication of elongated, reduction-blackened elements (e.g., fibers, rods and filaments) that may be used as interstitial or substitutional EMA media. Still additional versions relate to the containment of plural monofiber rods within a container at least partially filled with glass that has been powderized or fragmented and blackened by reduction. In these latter versions, the monofiber rods and blackened powder or fragments are then heated and drawn such that the powderized or fragmented glass fuses and functions as an EMA medium. Each of these alternative sets of versions is explained in greater detail further in this summary and in the detailed description that follows. For purposes of this specification and the appended claims, it is to be understood that the terms "blacken," "blackened," and "blackening" envision darkened, or the darkening of, materials that are not necessarily truly black. This is especially true, in various embodiments, when referring to "preblackened" materials that are subsequently heated and drawn because, as will be appreciated, the heating and drawing stretch the product and result in a "dilution," and perhaps some diffusion, of blackened material which, in turn, lightens the color of the material. Depending on the degree of heating and drawing, for example, previously "blackened" material could be grayish, brownish or even beige, for instance. Accordingly, "blacken," "blackened," and "blackening," for purposes of this specification and the appended claims include "darken," "darkened," and "darkening" and refer more to the material's capacity to exhibit a desired degree of extramural absorption than to exhibit a particular color or shade.

According to a first set of versions, a cladding tube defined by a wall having inner and outer surfaces is at least partially blackened prior to heating and collapsing about an optical core rod to form a selectively reduction-blackened monofiber rod. In a typical illustrative version, this is accomplished by fabricating the cladding from a glass that contains reducible ions (i.e., cations) such as lead or bismuth, for example. The cladding glass is then selectively exposed to a reducing atmosphere (e.g., heated hydrogen) resulting in darkening of the glass on and below exposed surfaces to a predetermined depth where cations are present. In various implementations, the material to be blackened is also heated; accordingly, in many cases, reduction is performed in a furnace into which reducing agent (e.g. hydrogen) is introduced for a predetermined time. In alternative implementations, the cladding tube is at least partially blackened on, and to a predetermined depth beneath, at least one of the inner surface and the outer surface of the tubing wall. Predetermined portions of the cladding tube can be selectively blackened by alternative processes including, by way of non-limiting example (i) providing reducible ions only in predetermined areas in which blackening is desired and then exposing the entire tube to a reducing atmosphere and (ii) providing a substantially constant distribution of reducible ions throughout the cladding tube material and then masking selected areas in which blackening is not desired before exposing the cladding tube to a reducing atmosphere. It will be appreciated that tubes and rods used to form monofiber rods reduction-blackened in accordance with the aforementioned methods may be of any cross-sectional geometry including, for example, round, square, regular-polygonal (e.g., pentagonal, hexagonal, octagonal, etc.) and irregular polygonal. Among the factors in the depth and density of the resultant blackening are (i) temperature at which the cladding tube is exposed; (ii) the concentration of reducing agent (e.g., di-atomic hydrogen or hydrogen in the form of a plasma) in the reducing atmosphere relative to "inert" constituents; (iii) the pressure under which the cladding tube is reduced; (iv) the type, density and depth of cations present in the cladding tube; and the type of material (e.g., glass) from which the cladding tube is formed. It will be appreciated that depth and density of blackening in the initial cladding tube are factors in the depth, density and uniformity of the blackening that is present in a final, drawn array. Accordingly, fabricators of particular embodiments must be mindful of the desired thickness and density of blackened regions in a final product and of the overall reduction ratio that a given monofiber rod will experience in the formation of the final product.

According to an alternative method of fabricating a selectively reduction-blackened monofiber rod in which at least a portion of the outer surface of the cladding is reduction-blackened, a cladding tube including reducible ions is drawn and collapsed around an optical core rod. Subsequently, the resultant monofiber rod is exposed to a reducing atmosphere in order to selectively blacken the cladding from the outside surface inward to a predetermined depth. Pursuant to the fabrication of various image-conducting, optical fiber array products, plural monofiber rods, each of which includes cladding that is at least partially blackened, are bundled for heating and drawing in a "multi-draw" step. Once heated and drawn, the plural fiber rods are adjacently fused in a product that is, in the optical fiber industry, commonly referred to as a "multi". In accordance with some alternative versions, plural "multies" are bundled for heating and drawing to form a "multi—multi" array. In versions beginning with monofiber rods in which substantially the entirety of at least one of the outer and inner surface of each monofiber-rod cladding is blackened, the multi and multi—multi draw processes result in arrays in which the cores are substantially optically isolated from other cores. Such optical isolation inhibits the undesirable propagation of stray light over the entire length of the array which, consequently, improves image contrast. Moreover, in a typical implementation, these advantages are achieved while (i) maintaining core-to-clad ratios and not impacting fiber spacing so that image resolution is maintained; (ii) eliminating the need to use special black glass tubing and individual EMA fibers as, respectively, circumferential and interstitial EMA media; (iii) reducing the complexity of the array assembly process; (iv) obviating adverse interactions between different glass compositions; and (v) improving overall internal quality by reducing assembly steps and adverse glass crystallization which results in image degradation. From a structural standpoint, an optical fiber array including fibers having claddings blackened along their entire lengths enables machining (e.g., grinding and polishing) to any desired depth without loss of optical isolation.

Although, as previously stated, various implementations obviate the need for interstitial or substitutional EMA media, alternative versions of image-transferring arrays having pre-blackened cladding further include at least one of (i) substitutional and (ii) interstitial pre-blackened EMA elements in the form of rods, filaments or fibers, for example. Although the terms "filament," "fiber," "rod" and the like, for example, may be regarded by a reader as having somewhat different meanings, those terms are used interchangeably for purposes of the specification and claims. Accordingly, for example, a description of the fabrication of an "EMA rod" is considered a disclosing description for the fabrication of an "EMA filament" and an "EMA fiber," by way of non-limiting example. Similarly, and perhaps more importantly, the broad interpretative scope attributed to each of these terms applies equally within the claims. Additionally, the terms "element" and "elongated element" are alternatively used to refer to variously configured EMA media. Conventional EMA rods are fabricated from dark glasses already having constituents that render the glass dark without blackening by reduction in a reducing atmosphere, for example. Although such conventional EMA elements can be included in image-conducting arrays fabricated in accordance with one or more implementations of the present invention, alternative versions relate to the novel fabrication of reduction-blackened elements that may be used as interstitial or substitutional EMA media.

According to one illustrative method of fabricating pre-blackened EMA elements, glass containing reducible ions is either powderized or broken into fragments sufficiently small to facilitate reduction-blackening of the entire interior of each fragment. The powder particles or fragments are then exposed to a reducing atmosphere such as heated diatomic hydrogen or hydrogen plasma to yield whichever is applicable of blackened powder and fragments. The pre-blackened powder/fragments are then drawn into elongated rod elements suitable for use as interstitial or substitutional EMA rods in a manner structurally analogous to the manner in which conventional EMA rods are currently incorporated into imaging arrays.

An alternative method of fabricating pre-blackened EMA elements includes drawing glass containing reducible ions into filaments sufficiently thin that substantially the entire cross-section thereof can be blackened by exposure to a reducing atmosphere. Once the filaments are blackened by reduction, plural such filaments are bundled, heated, drawn and fused to form an EMA rod that is uniformly blackened throughout its cross-section. Plural EMA rods made in accordance with this method may then be included among optical monofiber rods, for instance, in imaging array bundles for heating and drawing in general accordance with aforementioned methods of fabricating imaging arrays containing EMA media.

Representative embodiments are more completely described and depicted in the following detailed description and the accompanying drawings.

BRIEF DESCRIPTION OF THE DRAWINGS

FIG. A shows a fragmented cross-section of a known optical fiber imaging array and schematically depicts the behavior of alternative rays of light incident on the face of the array from different angles.

DETAILED DESCRIPTION

The following description of illustrative embodiments of ion-reduction-blackened extra-mural absorption elements and of image-conducting optical fiber arrays including components pre-blackened by reduction of reducible ions is demonstrative in nature and is not intended to limit the invention or its application of uses. The various implementations, aspects, versions and embodiments described in the summary and detailed description are in the nature of non-limiting examples falling within the scope of the appended claims and do not serve to define the maximum scope of the claims.

Figure 1:
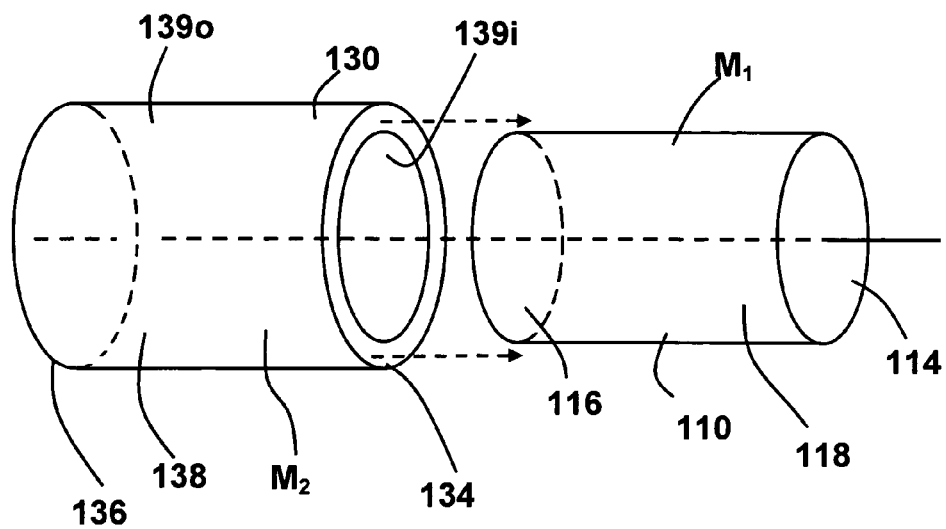
FIGS. 1 and 1A show an optical core rod and cladding tube made from a material containing reducible ions.
Figure 1A:
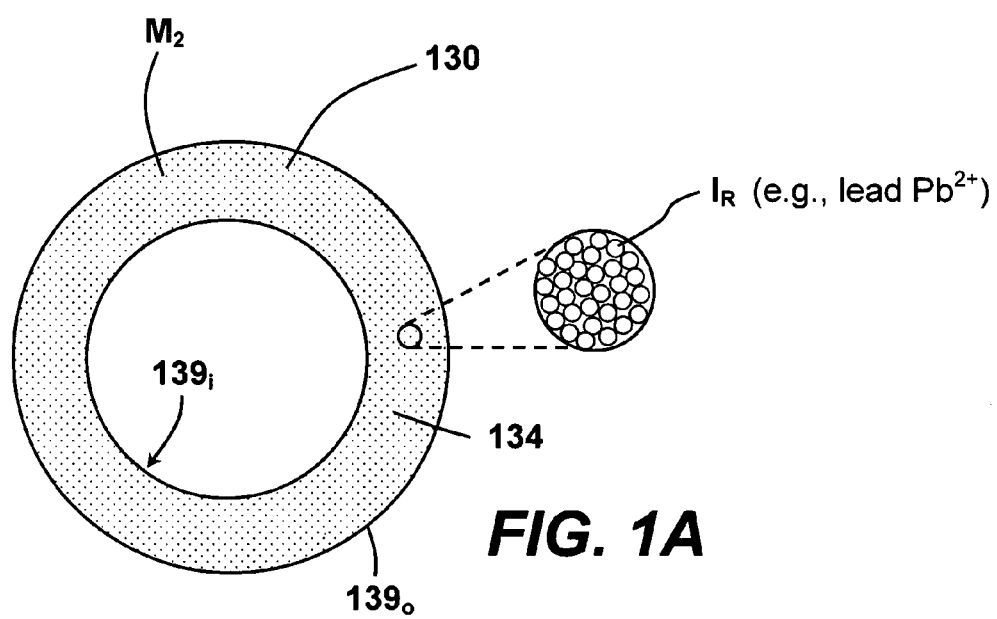
Figure 2A:
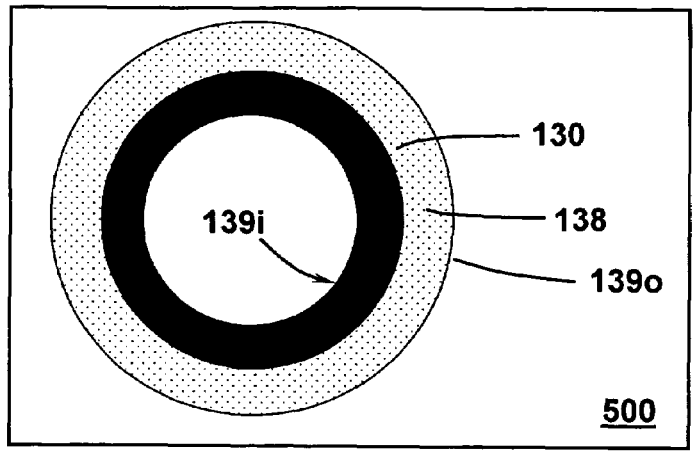
FIGS. 2A, 2B and 2C are end views of cladding tubes in which reducible ions have been exposed to a reducing atmosphere resulting in blackening in predetermined regions of the cladding tubes.
Figure 2B:
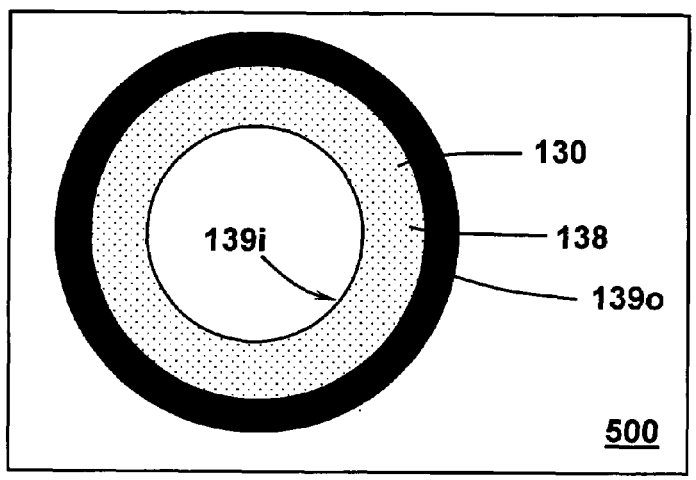
Figure 2C:
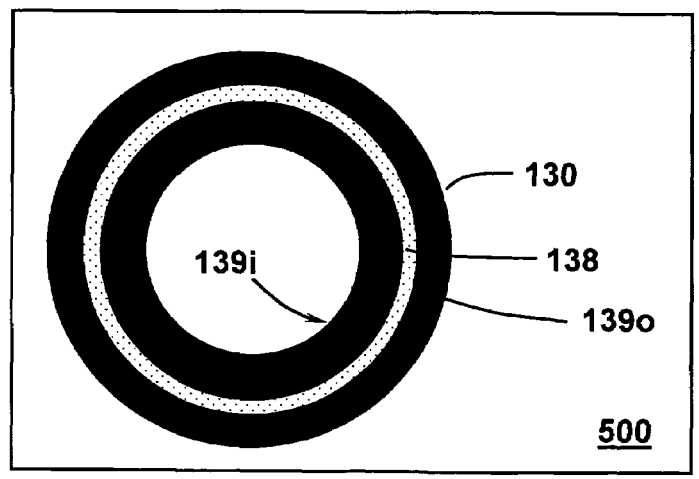

Referring to FIGS. 1 and 1A, an elongated optical core rod 110 fabricated from a first material $M_1$ characterized by a first refractive index $n_1$ has longitudinally opposed first and second ends 114 and 116 and is defined in part by a side surface 118 that extends between the first and second ends 114 and 116. An elongated cladding tube 130 made from a second material $M_2$ characterized by a second refractive index $n_2$ lower than the first refractive index $n_1$ has longitudinally opposed first and second ends 134 and 136 and is defined by a side wall 138 having inner and outer side wall surfaces $139_i$ and $139_o$. As shown in FIG. 1A, the material $M_2$ from which the cladding tube 130 is formed includes reducible ions $I_R$ that, when exposed to a reducing atmosphere, result in darkening of the material $M_2$. In alternative versions, the cladding tube 130 is selectively blackened along and beneath selected surfaces. FIGS. 2A, 2B and 2C depict cladding tubes 130 that have been reduction-blackened in reducing atmosphere 500, respectively, from the inner surface $139_i$ outward, the outer surface $139_o$ inward and both from the inner surface $139_i$ outward and the outer surface $139_o$ inward.

Figure 3:
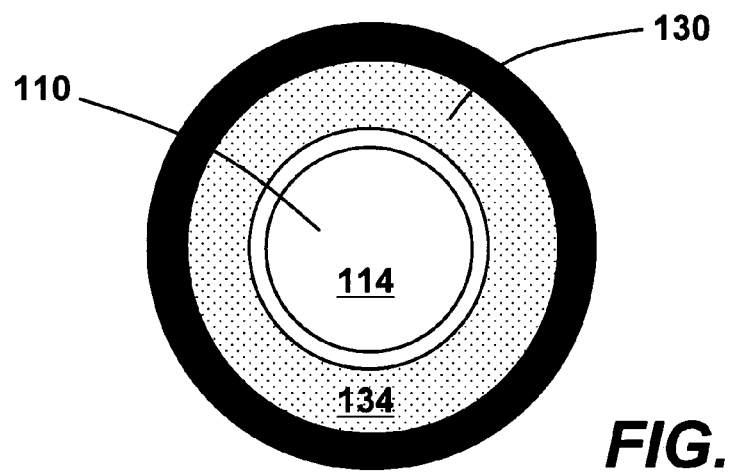
FIG. 3 is an end view of a core rod disposed within a cladding tube wherein the cladding tube has been reduction-blackened from the outer surface inward to a predetermined depth.
Figure 3A:
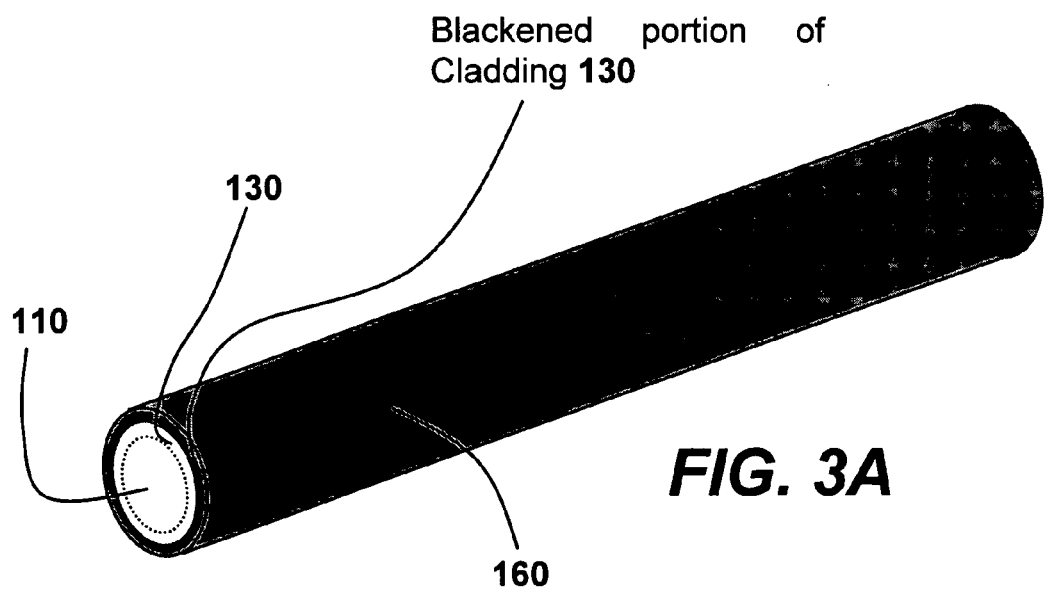
FIG. 3A depicts a monofiber rod fabricated by heating and drawing the core and cladding tube of FIG. 3.

Referring to the end view of FIG. 3, in a procedure analogous to that of the well-known rod-in-tube method, the core rod 110 is axially introduced into a cladding tube 130 that has been at least partially blackened by ion reduction and the cladding tube 130 and core rod 110 are heated and drawn such that the cladding tube 130 collapses around the core rod 110, and the core rod 110 and cladding tube 130 are lengthened and reduced in diameter, to form a selectively reduction-blackened monofiber rod 160, an example of which is illustrated in FIG. 3A.

Figure 4:
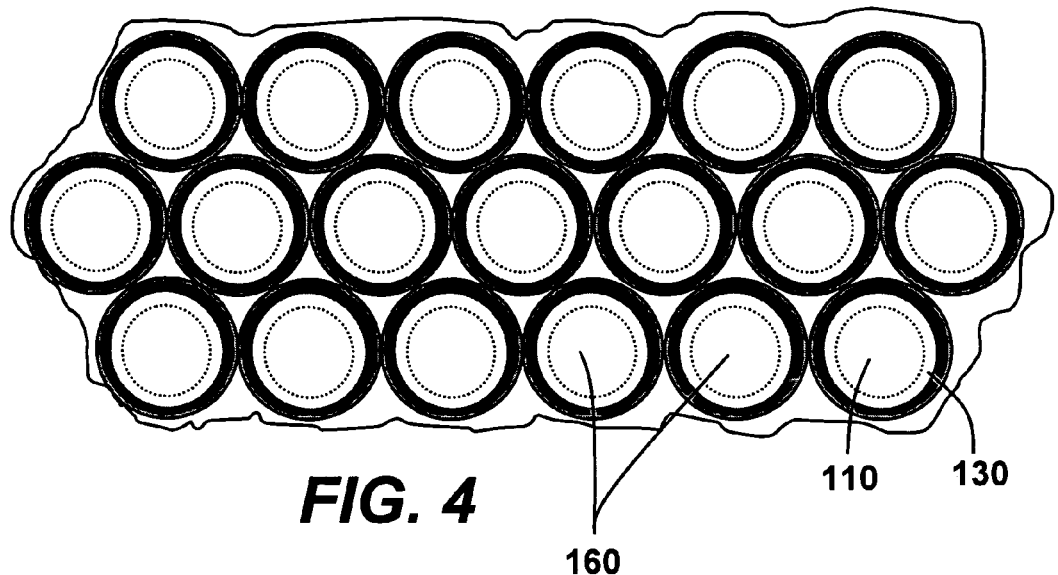
FIG. 4 shows a set of plural, pre-blackened monofiber rods bundled for heating and drawing in a fiber drawing tower.
Figure 4A:
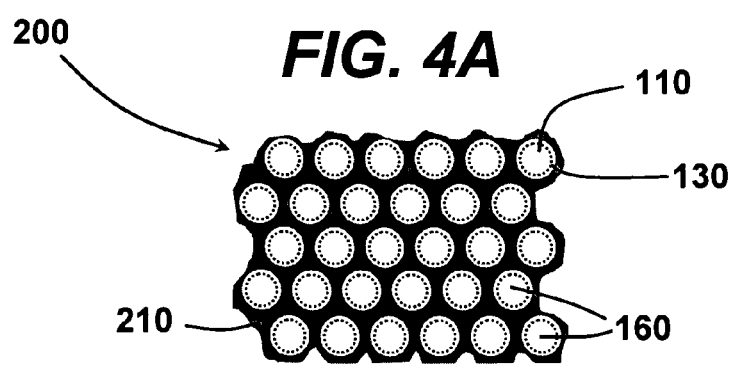
FIG. 4A is a representative section of an illustrative fused multi-array fabricated by heating and drawing bundled, pre-blackened monofiber rods.

In order to form an image-conducting optical fiber array, plural monofiber rods 160 including a selected set of monofiber rods 160 that are at least partially pre-blackened are bundled, as shown in FIG. 4, for heating and drawing in a "multi-draw" step. Referring to FIG. 4A, once heated and drawn, the plural monofiber rods 160 are adjacently fused in a product referred to as a "multi" or multi array 200. In the representative section of an illustrative fused multi array 200 of FIG. 4A, the reduction-blackened portions of the claddings 130 of adjacent monofiber rods 160 are fused into a contiguous EMA medium 210.

Figure 4B:
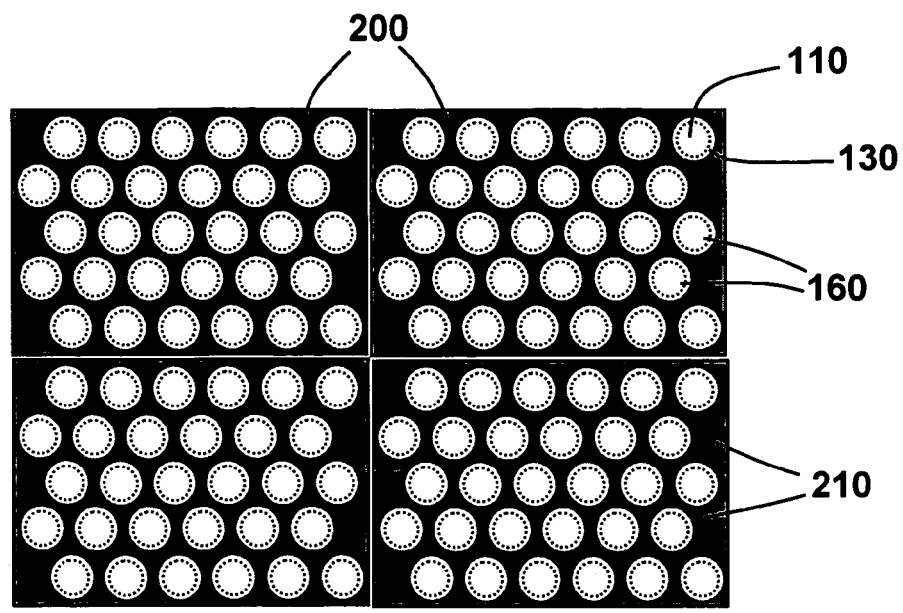
FIG. 4B shows plural multi-arrays made from pre-blackened monofiber rods bundled for heating and drawing.
Figure 4C:
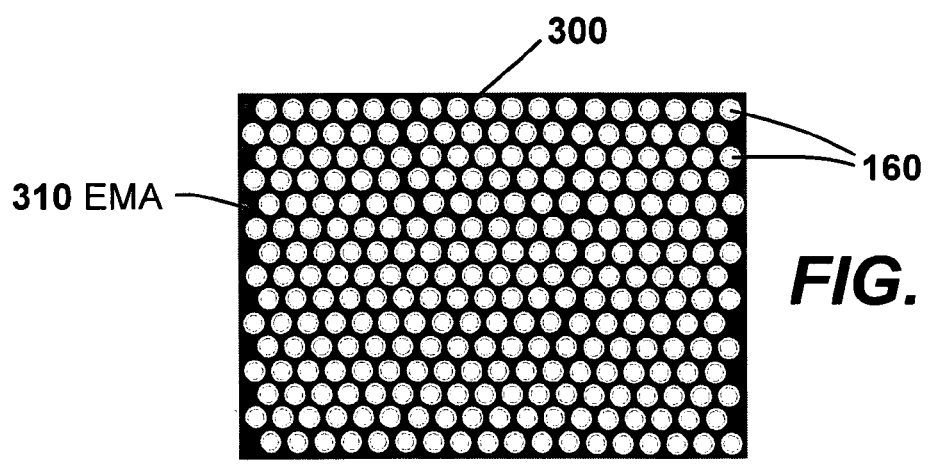
FIG. 4C is a representative section of an illustrative fused multi—multi array fabricated by heating and drawing plural multi-arrays such as the multi-array of FIG. 4A.

In accordance with some alternative versions, represented by FIGS. 4B and 4C, plural multi arrays 200 are bundled for heating and drawing to form a "multi—multi" array 300. In versions beginning with selectively reduction-blackened monofiber rods 160 in which substantially the entirety of at least one of the outer and inner surface $139_o$ and $139_i$ of each monofiber-rod cladding 130 is blackened, the multi and multi—multi draw processes result in arrays 200 and 300 in which individual waveguides (i.e., monofiber rods 160) are substantially optically isolated. Such optical isolation inhibits the undesirable propagation of stray light over the entire length of the array 200/300 which, consequently, improves image contrast.

Once a fiber array bundle has undergone its final heating and drawing, the bundle can be ground, polished and otherwise "finished." Because, in various aspects, blackened cladding 130 is present throughout the length of the bundle, cutting, grinding and polishing will not result in detrimental loss of EMA material 210. Moreover, selective core-etching from an end face will result in "wells" defined by a wall of at-least-partially-blackened cladding material and a recessed core (not shown). As shown in the illustrative multi arrays 200 of FIGS. 4A and 4B, as well as the multi—multi array 300 of FIG. 4C, in various aspects, a portion of each cladding 130 remaining non-blackened after initial reduction is "carried-through" the heating and drawing processes leaving non-blackened, reducible-ion-containing portions on the faces of a drawn array 200/300. If indicated in any particular implementation, once all cutting, grinding and/or polishing are completed, the otherwise finished array 200/300 may be exposed to a reducing atmosphere to cause reduction-blackening in the otherwise non-blackened, reducible-ion-containing portions or claddings 130, a process and result not shown in the drawings.

Figure 5:
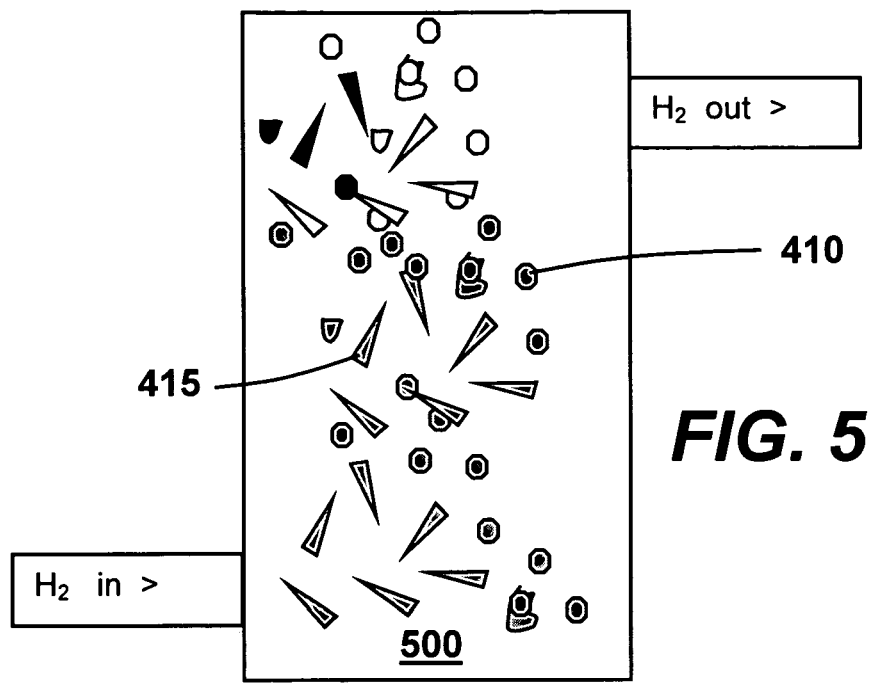
FIG. 5 shows pulverized, reducible-ion-containing glass undergoing reduction-blackening in a reducing atmosphere.
Figure 5A:
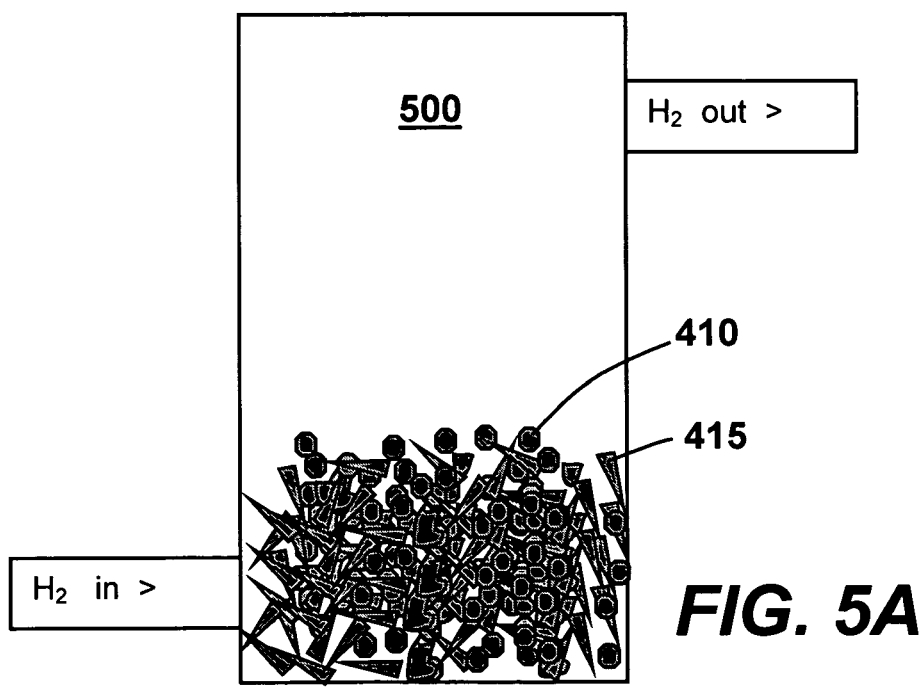
FIG. 5A shows the pulverized glass of FIG. 5 after blackening.
Figure 5B:
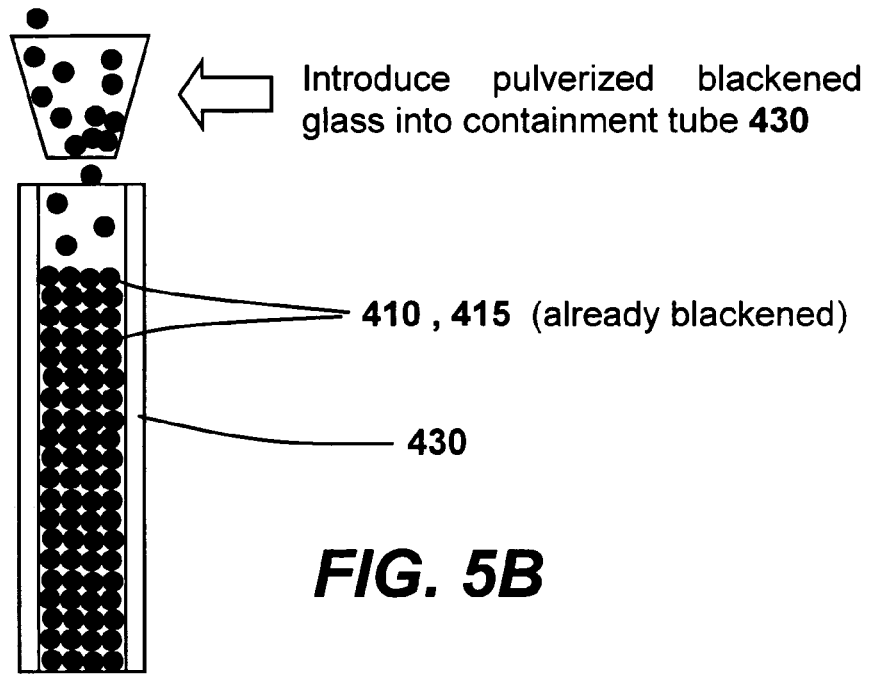
FIG. 5B shows the introduction of pulverized, reduction-blackened glass into a containment tube.
Figure 5C:
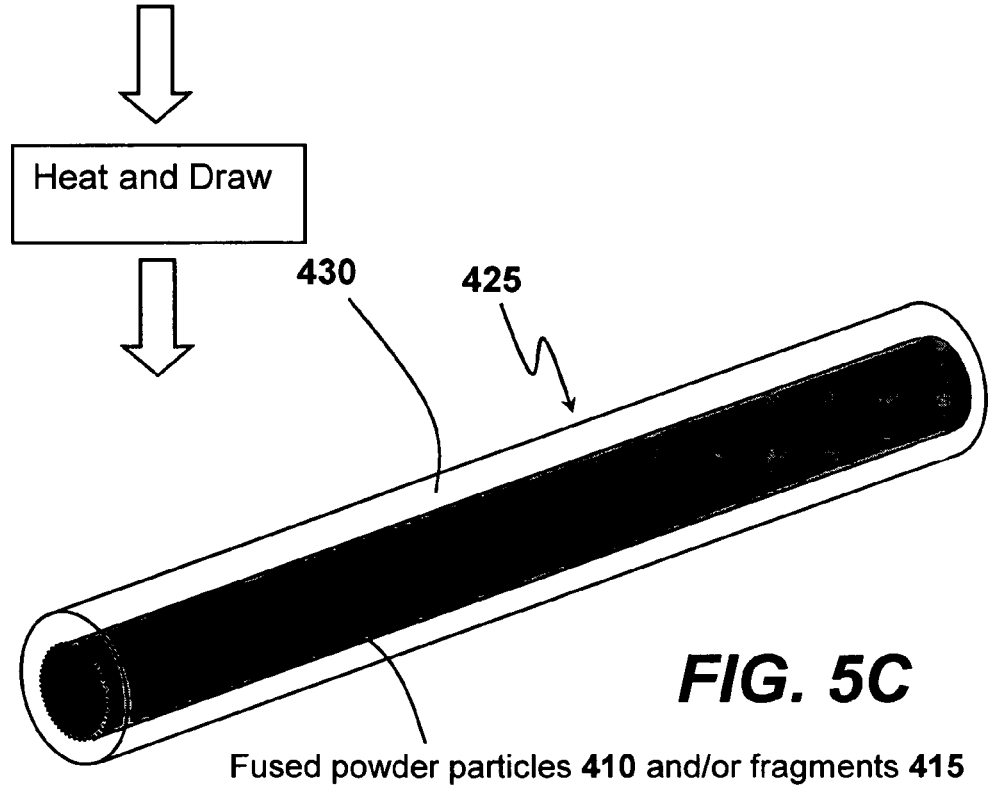
FIG. 5C depicts an EMA rod fabricated by heating and drawing the tube and the blackened glass of FIG. 5B.

As stated in the summary, various alternative implementations incorporate at least one of (i) interstitial and (ii) substitutional EMA media. In some versions, conventional EMA rods are interstitially or substitutionally included in arrays including selectively pre-blackened fiber cladding 130. However, alternative versions include EMA material blackened by reduction prior to being formed for inclusion as interstitial or substitutional EMA elements. Referring to FIGS. 5 and 5A, glass including reducible ions is pulverized to form at least one of (i) powder particles 410 and (ii) fragments 415 sufficiently small to enable reduction-blackening of the interior of each particle 410 and/or fragment 415. The powder particles 410 and/or fragments 415 are then exposed to a reducing atmosphere 500 including a reducing reagent such as heated diatomic hydrogen or hydrogen plasma to yield blackened powder particles 410 and/or glass fragments 415. FIG. 5 shows powder particles 410 and fragments 415 undergoing reduction-blackening, while FIG. 5A shows the powder particles 410 and fragments 415 following the completion of a reduction-blackening process. The pre-blackened powder/fragments are then drawn, or otherwise formed, into EMA elements (e.g. a rod) suitable for use as interstitial or substitutional EMA rods 425 (FIGS. 5C, 5E and 6) in a manner procedurally and structurally analogous to the manner in which conventional EMA rods are currently incorporated into imaging arrays. Referring to FIGS. 5B and 5C, one method of forming the blackened powder 410/fragments 415 into an EMA rod 425 includes introducing the blackened powder 410/fragments 415 into a glass containment tube 430 for heating and drawing into a filament or EMA rod 425. As represented in FIG. 5C, the particles 410 and fragments 415 are fused within and to the containment tube 430 subsequent to the heating and drawing thereof. In at least some versions in which powder 410/fragments 415 are drawn into filaments, plural filaments are subsequently bundled, heated and drawn to form an EMA rod 425 (not shown).

Figure 5D:
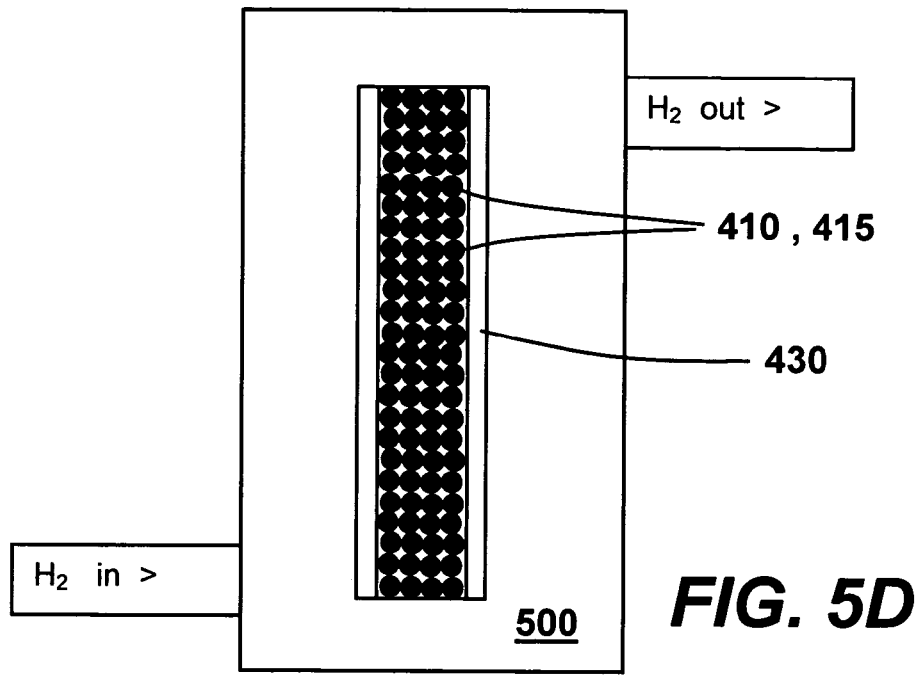
FIG. 5D illustrates the blackening of reducible-ion-containing glass particles and/or fragments contained in a containment tube.
Figure 5E:
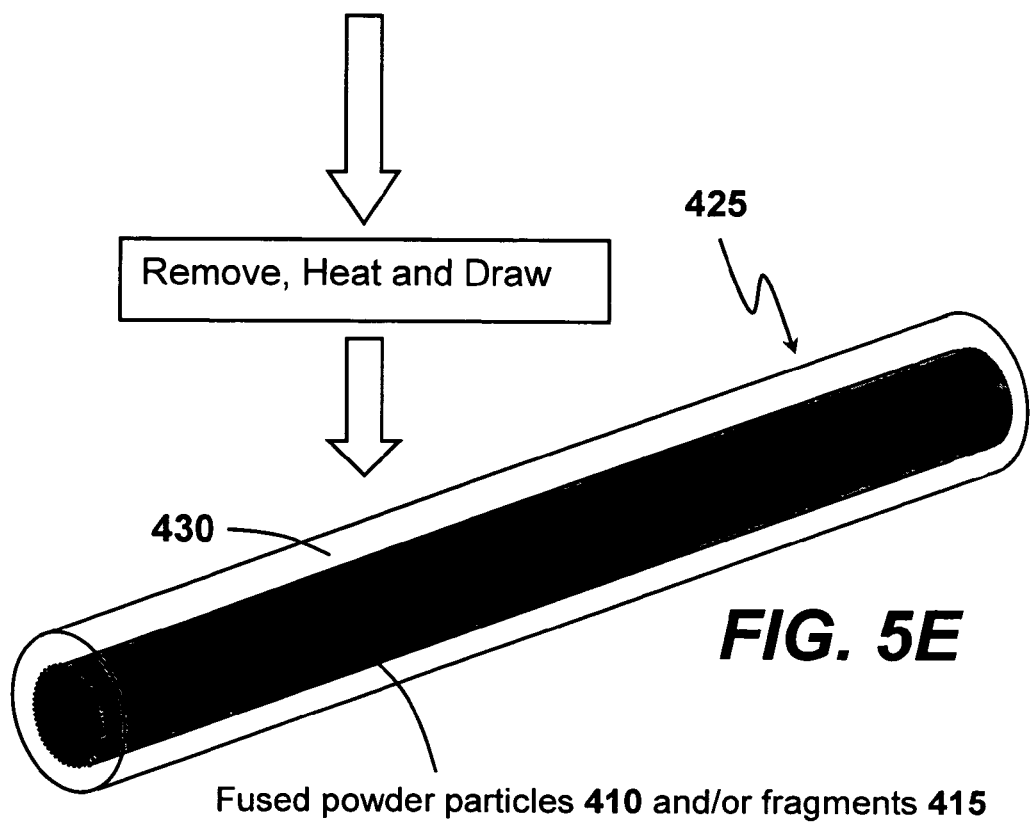
FIG. 5E depicts and EMA rod fabricated by heating and drawing the tube and the blackened glass of FIG. 5D.

Referring to FIGS. 5D and 5E, a pre-blackened EMA rod 425 is alternatively formed by introducing at least one of (i) powder particles 410 and (ii) fragments 415 of pulverized glass containing reducible ions into a glass containment tube 430. The containment tube 430 is then placed into a reducing atmosphere 500 where gaseous reducing re-agent (e.g. hydrogen) passes through the containment tube 430 to reduction-blacken the pulverized glass therein. Once the tube contents are reduction-blackened, the containment tube 430 and the reduction-blackened pulverized glass are heated and drawn to form an EMA filament or rod 425. In various versions, the containment tube 430 is fabricated from a glass including reducible ions such that the containment tube 430 itself is also reduction-blackened during exposure to the reducing atmosphere 500.

Figure 6:
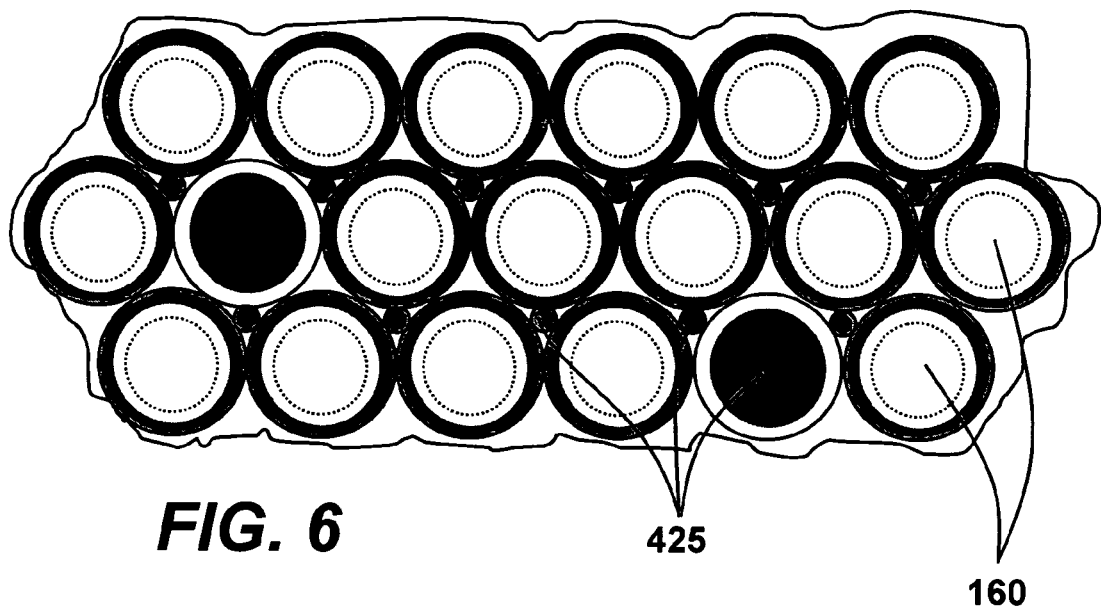
FIG. 6 shows a bundle of monofiber rods including substitutional and interstitial EMA rods fabricated from reduction-blackened pulverized glass.

FIG. 6 depicts an illustrative set of plural selectively reduction-blackened monofiber rods 160 bundled for heating and drawing. Among the monofiber rods 160 are two substitutional EMA rods 425 and several interstitial EMA rods 425 fabricated by fusing and forming at least one of (i) reduction-blackened powder particles 410 and/or reduction-blackened fragments 415 of glass including reducible ions.

Figure 7A:
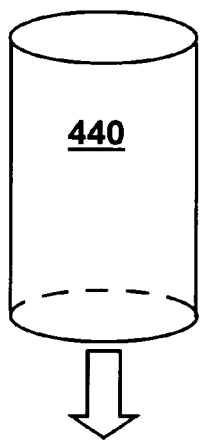
FIG. 7A depicts a rod of glass containing reducible ions.
Figure 7B:
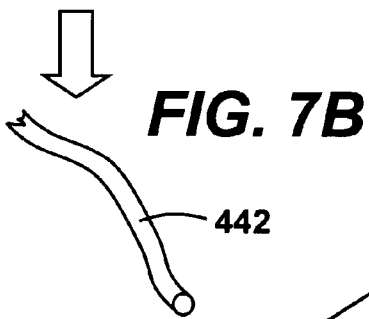
FIG. 7B shows a representative length of filament fabrication by heating and drawing the rod of FIG. 7A.
Figure 7D:
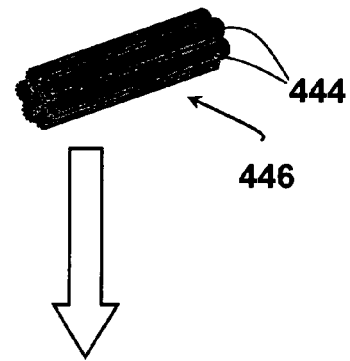
FIG. 7D shows plural reduction-blackened filaments bundled to form a blackened-filament bundle.
Figure 7C:
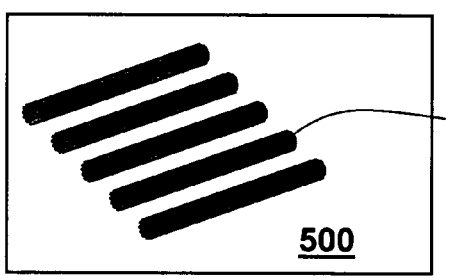
FIG. 7C shows plural filaments of the type shown in FIG. 7B undergoing reduction-blackening.
Figure 7E:
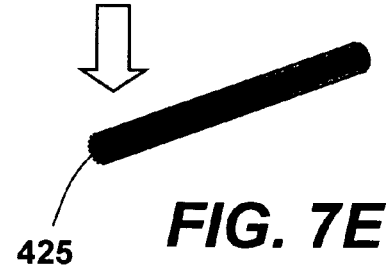
FIG. 7E depicts an EMA rod formed by heating, drawing and fusing the bundled filaments of FIG. 7D.
Figure 7F:
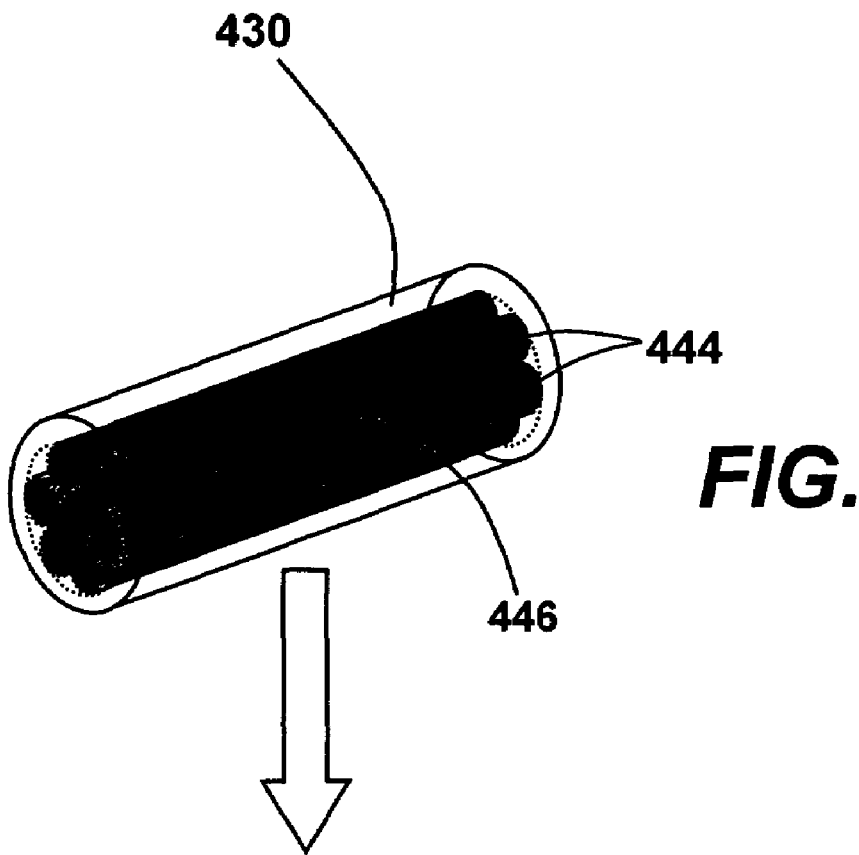
FIG. 7F indicates the introduction of reduction-blackened filaments into a containment tube.
Figure 7G:
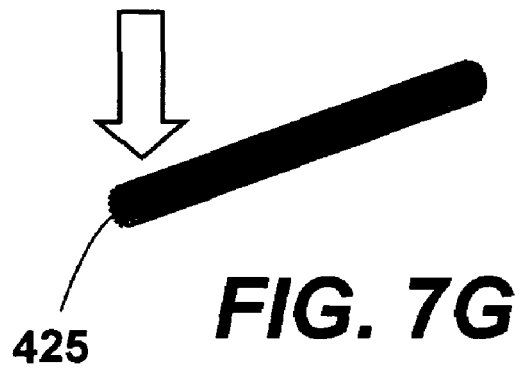
FIG. 7G depicts a an extra-mural absorption element formed by heating and drawing the containment tube and reduction-blackened filaments of FIG. 7F.

In conjunction with FIGS. 7A through 7E, there is described an additional alternative method of fabricating an extra-mural absorption element adapted for incorporation as one of (i) a substitutional and (ii) an interstitial extra-mural absorption medium in an image-conducting optical fiber array. As represented by FIGS. 7A and 7B, a reducible-ion-containing glass 440 is heated and drawn into a reducible-ion-containing filament 442. The reducible-ion-containing filament 442 is selectively reduction-blackened through exposure to a reducing atmosphere 500, as shown in FIG. 7C, in order to yield a reduction-blackened filament 444. A plurality of similarly fabricated and selectively reduction-blackened filaments 444 is bundled as, for example, in FIG. 7D in order to form a blackened-filament bundle 446. The blackened-filament bundle 446 is heated and drawn to form an extra-mural absorption element 425 such as the EMA rod 425 shown in FIG. 7E. In various implementations, the reducible-ion-containing filament 442 is drawn sufficiently thinly to enable reduction-blackening across the interior thereof. In alternative implementations, especially among those employing lead-containing materials, blackening may be primarily obtainable only at or near the surface of the filament 444, but the reduction results in very dark blackening. In still additional implementations, as explained in conjunction with FIGS. 7F and 7G, reduction-blackened filaments 444 are bundled inside a containment tube 430 prior to heating and drawing of the blackened-filament bundle 446 and the containment tube 430 such that the containment tube 430 collapses around the blackened-filament bundle 446 during the heat and draw process to form an extra-mural absorption element 425. It is to be understood that already-blackened reducible-ion-containing filaments (i.e., reduction-blackened filaments 444) may be introduced into a containment tube 430 for heating and drawing or reducible-ion-containing filaments 442 may be introduced into a containment tube 430 and then reduction-blackened by exposure to a reducing atmosphere 500 while contained in the containment tube 430. In steps analogous to those previously described in association with implementations utilizing glass particles 410 and/or fragments 415, the containment tube 430 inside which the reduction-blackened filaments 444 are bundled may itself be fabricated from an reducible-ion-containing glass 440 and, furthermore, be selectively exposed to a reducing atmosphere 500 for at least partial reduction-blackening at least one of (i) prior to introducing the blackened-filament bundle 446 therein, (ii) prior to heating and drawing, (iii) subsequent to heating and drawing and (iv) prior to the introduction of reducible-ion-containing filaments 442 into the containment tube 430 such that, in the later case, blackening of the containment tube 430 and the filaments 442 can be performed simultaneously.

Figure 8A:
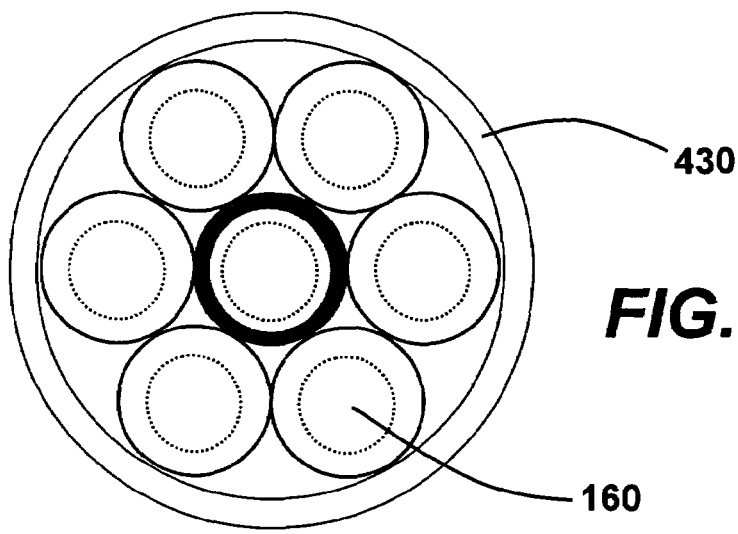
FIG. 8A shows a plurality of optically conductive monofiber rods bundled in a containment tube.
Figure 8B:
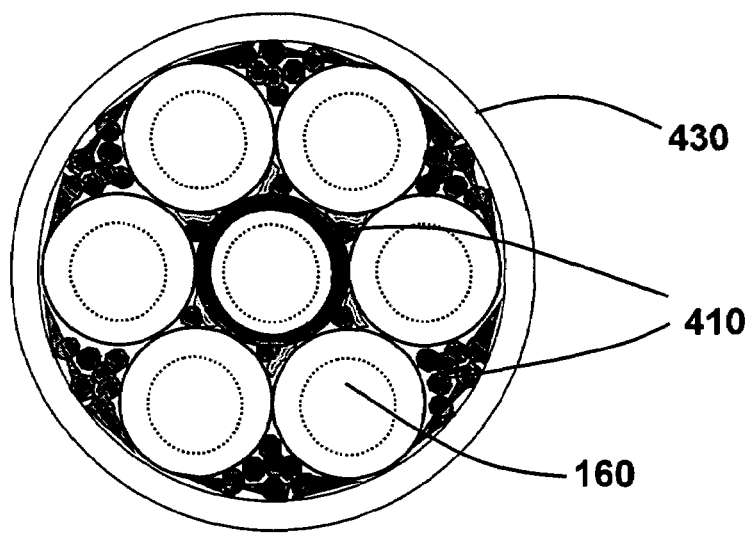
FIG. 8B shows reduction-blackened pulverized glass filling interstices between the monofiber rods and the containment tube and monofiber rods on the assembly of FIG. 8A.
Figure 8C:
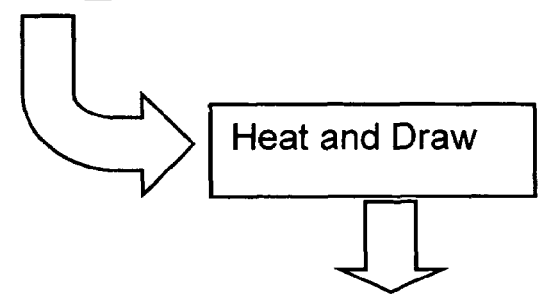
FIG. 8C depicts an illustrative image-conducting optical fiber array including reduction-blackened extra-mural absorption media formed by heating and drawing the assembly of FIG. 8B.
Figure 8C:
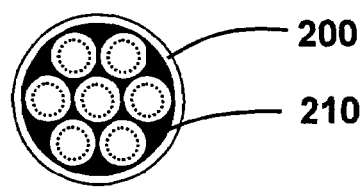

With reference to FIGS. 8A through 8C, an alternative method of fabricating an image-conducting optical fiber array 200 including reduction-blackened extra-mural absorption media 210 is described. As shown in FIG. 8A, a plurality of optically conductive monofiber rods 160 is provided and bundled inside a containment tube 430. In FIG. 8B a quantity of reducible-ion-containing pulverized glass including at least one of (a) powder particles 410 and (b) fragments 415 is provided and introduced into the containment tube 430 to at least partially fill interstices between (i) the containment tube and the monofiber rods 160 and (ii) the monofiber rods 160. It will be appreciated by analogy from aforementioned methods of forming EMA elements 425 from pulverized glass in a containment tube 430 that the pulverized glass may be exposed to a reducing atmosphere in order to yield reduction-blackened pulverized glass before, following or both before and following the introduction of the pulverized glass into the containment tube 430. In the processing shown between FIGS. 8B and 8C, the bundled monofiber rods 160, the containment tube 430 and the reduction-blackened pulverized glass (i.e., 410 and 415) are heated and drawn to form an image-conducting optical fiber array 200 including reduction-blackened extra-mural absorption media 210 such as that shown in FIG. 8C.

The foregoing is considered to be illustrative of the principles of the invention. Furthermore, since numerous modifications and changes will readily occur to those skilled in the art, it is not desired that the foregoing limit the invention to the exact construction and operation shown and described. Accordingly, all suitable modifications and equivalents may be resorted to that appropriately fall within the scope of the invention as expressed in the appended claims.

What is claimed is:

1. A method of fabricating an extra-mural absorption element adapted for incorporation as one of (i) a substitutional and (ii) an interstitial extra-mural absorption medium in an image-conducting optical fiber array, the method comprising:

provided a glass containment tube;

providing a quantity of reducible-ion-containing glass pulverized to form at least one of (a) powder particles and (b) fragments;

exposing the pulverized glass to a reducing atmosphere in order to yield reduction-blackened pulverized glass;

introducing the pulverized glass into the glass containment tube; and heating and drawing the pulverized glass and containment tube.

2. The method of claim 1 wherein the pulverized glass is exposed to a reducing atmosphere prior to the introduction of the pulverized glass into the containment tube.

3. The method of claim 1 wherein the pulverized glass and the containment tube are exposed to a reducing atmosphere after the introduction of the pulverized glass into the containment tube.

4. The method of claim 3 wherein the containment tube is fabricated from a glass including reducible ions such that the containment tube is at least partially blackened when the containment tube and pulverized glass are exposed to the reducing atmosphere.

5. An extra-mural absorption element fabricated in accordance with the method of claim 1.

6. A method of fabricating an extra-mural absorption element adapted for incorporation as one of (i) a substitutional and (ii) an interstitial extra-mural absorption medium in an image-conducting optical fiber array, the method comprising:

heating and drawing a reducible-ion-containing glass into a reducible-ion-containing filament;

bundling a plurality of reducible-ion-containing filaments in order to form a filament bundle;

exposing the plurality of reducible-ion-containing filaments to a reducing atmosphere in order to yield reduction-blackened filaments which, when bundled, form a blackened-filament bundle; and heating and drawing the blackened-filament bundle.

7. The method of claim 6 wherein the reducible-ion-containing filament is drawn sufficiently thinly to enable reduction-blackening across the interior thereof.

8. The method of claim 6 wherein the reducible-ion-containing filaments are bundled inside a containment tube prior to heating and drawing of the blackened-filament bundle and the containment tube such that the containment tube collapses around the blackened-filament bundle.

9. The method of claim 8 wherein the containment tube is fabricated from a glass including reducible ions and is at least partially reduction-blackened at least one of (i) prior to and (ii) after heating and drawing with the blackened-filament bundle.

10. The method of claim 8 wherein the reducible-ion-containing filaments are at least partially blackened by exposure to a reducing atmosphere at least one of (i) prior to and (ii) following introduction of the reducible-ion-containing filaments into the containment tube.

11. An extra-mural absorption element fabricated in accordance with the method of claim 6.

12. A method of fabricating a selectively reduction-blackened monofiber rod including a core and a cladding, wherein the selectively reduction-blackened monofiber rod is adapted for incorporation in an image-conducting optical fiber array and the cladding exhibits extra-mural absorption properties, the method comprising:

providing an optical core rod;

providing a cladding tube defined by a wall having inner and outer surfaces and being fabricated from a glass containing reducible ions;

exposing at least a portion of the cladding tube to a reducing atmosphere in order to selectively reduction-blacken predetermined portions of the cladding tube; and heating and collapsing the cladding tube around the core.

13. The method of claim 12 wherein (i) the cladding tube is exposed to a reducing atmosphere prior to heating and collapsing the cladding tube around the core rod and (ii) at least a portion of the inner surface of tube wall is reduction-blackened by exposure to the reducing atmosphere.

14. The method of claim 12 wherein (i) the cladding tube is heated and collapsed around the core rod prior to the selective exposure of the cladding tube to the reducing atmosphere and (ii) at least a portion of the outer surface of tube wall is reduction-blackened by exposure to the reducing atmosphere.

15. A selectively reduction-blackened monofiber rod fabricated in accordance with the method of claim 12.

16. A method of fabricating an image-conducting optical fiber array including reduction-blackened extra-mural absorption media, the method comprising:

(a) providing a plurality of selectively reduction-blackened monofiber rods, each of which monofiber rods is fabricated in accordance with a method including the steps of (i) providing an optical core rod;

(ii) providing a cladding tube defined by a wall having inner and outer surfaces and fabricated from a glass containing reducible ions;

(iii) exposing at least a portion of the cladding tube to a reducing atmosphere in order to selectively reduction-blacken predetermined portions of the cladding tube; and (iv) heating and collapsing the cladding tube around the core;

(b) bundling a plurality of the selectively reduction-blackened monofiber rods in order to form a monofiber-rod bundle; and (c) heating and drawing the monofiber-rod bundle such that the constituent reduction-blackened monofiber rods are adjacently fused in a fused array.

17. The method of claim 16 further comprising positioning among the selectively reduction-blackened monofiber rods in the monofiber-rod bundle at least one of (i) at least one substitutional extra-mural absorption medium and (ii) at least one interstitial extra-mural absorption medium.

18. The method of claim 17 wherein at least one of the at least one substitutional extra-mural absorption medium and the at least one interstitial extra-mural absorption medium is fabricated in accordance with a method including the steps of providing a glass containment tube;

providing a quantity of reducible-ion-containing glass pulverized to form at least one of (a) powder particles and (b) fragments;

exposing the pulverized glass to a reducing atmosphere in order to yield reduction-blackened pulverized glass;

introducing the pulverized glass into the glass containment tube; and heating and drawing the pulverized glass and containment tube.

19. The method of claim 17 wherein at least one of the at least one substitutional extra-mural absorption medium and the at least one interstitial extra-mural absorption medium is fabricated in accordance with a method including the steps of heating and drawing a reducible-ion-containing glass into a reducible-ion-containing filament;

exposing the reducible-ion-containing filament to a reducing atmosphere in order to yield a reduction-blackened filament;

bundling a plurality of reduction-blackened filaments in order to form a blackened-filament bundle; and heating and drawing the blackened-filament bundle.

20. An image-conducting optical fiber array fabricated in accordance with the method of claim 16.

21. An image-conducting optical fiber array fabricated in accordance with the method of claim 17.

22. A method of fabricating an image-conducting optical fiber array including reduction-blackened extra-mural absorption media, the method comprising:

providing a plurality of optically conductive monofiber rods;

bundling the plurality of monofiber rods in order to form a monofiber-rod bundle;

providing a quantity of reducible-ion-containing glass pulverized to form at least one of (a) powder particles and (b) fragments;

exposing the pulverized glass to a reducing atmosphere in order to yield reduction-blackened pulverized glass;

introducing the pulverized glass into an interstice between at least two monofiber rods in order to at least partially fill the insterstice; and heating and drawing the monofiber-rod bundle and reduction-blackened pulverized glass such that the monofiber rods and reduction-blackened pulverized glass fuse to form an image-conducting optical fiber array including reduction-blackened extra-mural absorption media.

23. The method of claim 22 further comprising:

bundling the plurality of monofiber rods in order to form a monofiber-rod bundle inside a containment tube;

introducing the pulverized glass into the glass containment tube in order to at least partially fill interstices between at least one of (i) the containment tube and a monofiber rod and (ii) at least two monofiber rods within the containment tube; and heating and drawing the monofiber-rod bundle, containment tube and reduction-blackened pulverized glass such that the monofiber rods, reduction-blackened pulverized glass and the containment tube fuse to form an image-conducting optical fiber array including reduction-blackened extra-mural absorption media.

* * * * *